Figure 3:
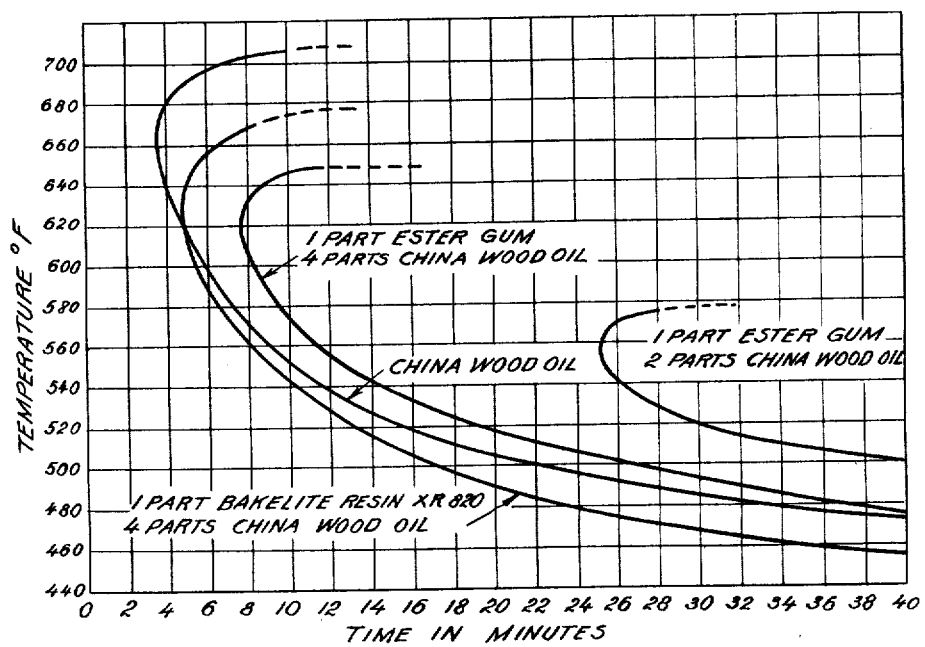

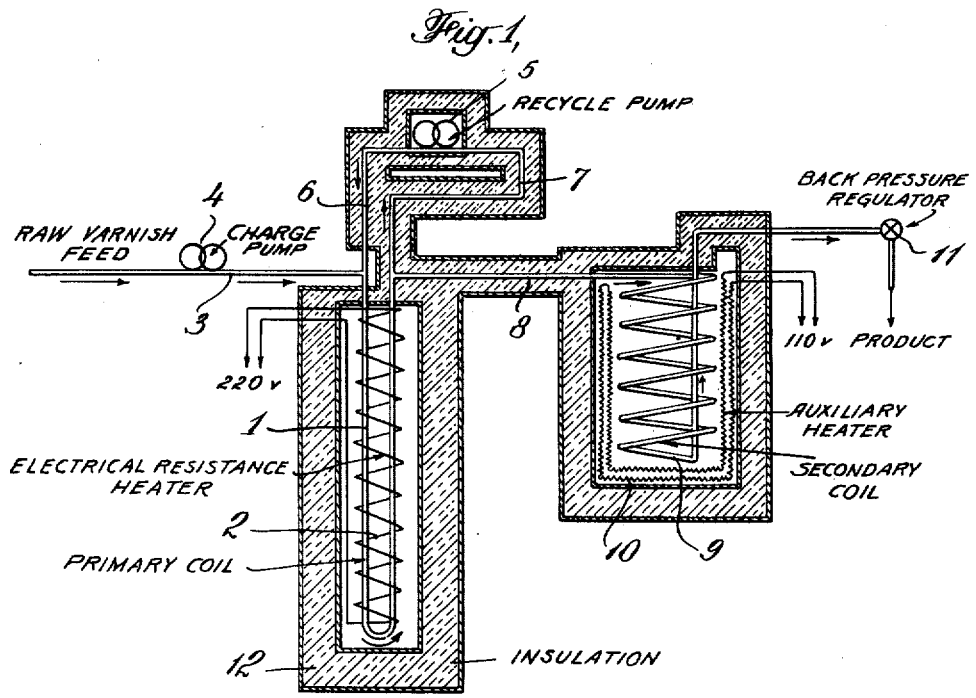
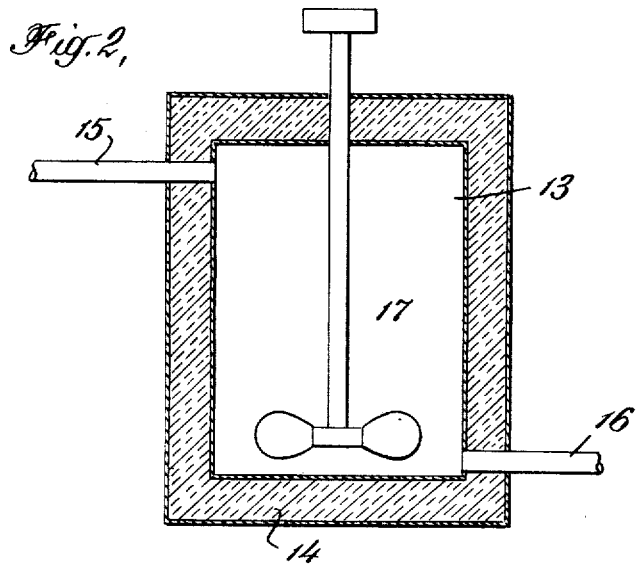

Patented May 19, 1942

2,283,872

UNITED STATES PATENT OFFICE 2,283,872

VARNISH MANUFACTURE

Malcolm F. Pratt, Woodbury, N. J., and Thomas L. Apjohn, Kew Gardens, and John Happel, Brooklyn, N. Y., assignors to Socony-Vacuum Oil Company, Incorporated, New York, N. Y., a corporation of New York Application February 25, 1939, Serial No. 258,410

9 Claims. (Cl. 260—19)

This invention relates to the manufacture of varnishes and the like and is particularly concerned with the manufacture of varnishes containing China-wood oil.

Heretofore, varnishes have been prepared by batch processes. In the usual process a resin and oil mixture is cooked in a large kettle or pot over an open fire at a temperature around 500° F. until the resin and oil are so combined that they will not separate on cooling, and a suitable consistency or body has been developed. Generally, the large kettles are mounted on trucks whereby they can be rolled on and off of the fire in order to control the reaction. When the preparation of the varnish base is completed, it is withdrawn and, while still warm, a suitable thinner is added to give the desired consistency.

The disadvantages and limitations of the processes afforded by the prior art are numerous. Among these disadvantages is the ever present danger of fire in the varnish factory. When heating a batch of resin and oil in a large kettle, an exact control over the temperature is practically impossible. Likewise rapid heating or sudden changing of the temperature of the mixture can not be effected. Further, since the main reactions involved are exothermic, they occasionally get beyond control at the high temperatures employed as, for instance, around 600° F., resulting in a foaming over of the reaction mixture, which, being highly inflammable, may catch on fire by falling into the flame serving to heat the kettles. Moreover, as the thinners are usually added while the varnish base is still quite hot, a portion thereof is volatilized. These combustible vapors form an additional fire hazard, as well as an appreciable production waste. Accordingly, any method which reduces fire hazards and waste in a varnish factory is of vital interest to the industry.

A further disadvantage of the prior processes is the partial oxidation that takes place due to a large surface of resin and oil in the kettle being exposed to the air while at a high temperature. Furthermore, since the kettle is heated to an extremely high temperature at the bottom in order to sufficiently heat the whole batch, there is considerable danger of local overheating of the material nearer the bottom, resulting in an inferior product. The danger of local overheating in a batch process is further increased because of the mechanical difficulties in maintaining a large batch of viscous varnish base agitated and thoroughly stirred.

In addition to the many disadvantages mentioned above, there is a distinct limitation to the capacity of the varnish factory operating on a batch principle. Each kettle being of a definite size does not afford flexibility for increasing the factory output and as each kettle with its firing means requires considerable space, varnish factories of large commercial production operating in accordance with the processes now enjoyed by the art require an inordinate amount of room space as compared to a factory of similar production capacity which operates according to our process.

While efforts have been made to improve the prior art processes as, for instance, by employing electrical heating means and radiant heat fires, it is quite obvious that even if these developments were employed they would not eliminate the many disadvantages such as local overheating, non-uniformity of product, necessity for large plant space, etc. In spite of the recognized disadvantages and limitations in the art, no one, so far as is known, up to the time of applicants, have succeeded in successfully removing these difficulties, which still form a part of the present day installations. Probably one of the principal reasons for the apparently unsuccessful solution to these important difficulties is the complications injected into the problem because of the peculiar nature of China-wood oil.

China-wood oil, which is by far the most commonly used oil in the manufacture of varnishes today, possesses certain inherent properties which distinguishes it from practically all other drying oils used as varnish vehicles. If China-wood oil is used in varnishes in a raw condition, the varnish coating may check and develop a frosted appearance during drying, or in the language of the art, it will not be "gas-proof." Hence, it is imperative that the oil be cooked with the resin sufficiently to give it not only the desired body, but also to give it gas-proofness. In order to impart these latter desired properties to the varnish, it must be heated above about 450°, and usually between about 450° and 650° F., the top temperature varying greatly depending upon the specific resin and the percentages present. When the varnish is heated at too high a temperature as, for instance above about 700° F., nondrying properties are imparted thereto (in certain resin mixtures this upper limit temperature may be much lower than 700° F.) Accordingly, it can be seen that considerable care must be exercised with regard to the proper temperature to which the China-wood oil varnish is heated. The main distinguishing feature of China-wood oil from most drying oils, however, is its tending to form a gel or solidify more quickly when heated over too long a period at the temperatures required for varnish making. For this reason the operator must be unusually careful in cooking the varnish containing China-wood oil.

With a view to eliminating many, if not all, the disadvantages and limitations of the varnish making plants, we have carried out considerable research toward developing a continuous process. The peculiar nature of China-wood oil has tremendously complicated the task. While in batch operation, the tendency of the oil to solidify was ever present, yet by careful operation it could be and is avoided. On the other hand when we attempted to carry out a continuous process, it first appeared to be impossible to avoid solidification of the product. Not only did the tendency to solidify appear to be accentuated in continuous operation, but as is readily apparent, such a result is more serious. The continuous operation is usually carried out by flowing the varnish ingredients through an enclosed heating zone such as a coil heater. Therefore, when the product solidifies, the coil becomes clogged and a complicated cleaning operation is required.

While we do not wish to be held to any theory, it is our belief that the viscous flow of the material through the heater is largely responsible for the difficulties encountered with gelation in a continuous process. As is well known, viscous materials of the nature of a varnish base flow in layers in what is known as "viscous flow." The layers of the material nearer the center of the stream flow the fastest while the outside layers flow the slowest. It appears to us that when a varnish base comprising a gelling oil such as China-wood oil is first started through a heater for preparing a varnish, the central layers of the varnish base flow on through and emerge properly processed. However, the slower moving or even stationary outer layers remain in the heater longer and as the manufacturing is continued these outer layers begin to solidify. After solidification is once started on the walls of the heater, it keeps building inwardly, solidifying the outer layer of the flowing stream, until finally the whole heater or coil is clogged.

In view of the above theory, we conceived that a feasible continuous process might be developed, if a sufficiently turbulent flow was maintained throughout the heater. From a practical standpoint, it was found that this sufficiency of turbulence of flow throughout the entire length of the heater was obtained best by diluting the varnish base, i. e., by making it less viscous. Accordingly, by initially adding a varnish thinner to the varnish base, the viscosity of the material being processed was reduced and when it was then sent through the heater no deleterious clogging or solidification occurred. It also is possible that this initial addition of a thinner further aided in the prevention of solidification by the thinner dissolving the solid, if any, as it was formed along the walls of the heating coil. It is to be noted a finished varnish was prepared directly by this procedure rather than a varnish base to which a thinner would have to be added subsequently. This important development forms the subject matter of our co-pending application Serial Number 207,716, filed May 13, 1938.

As a result of the thinner being present in the mixture sent through the heater in the process of our co-pending application, it is necessary to maintain the system under relatively high pressure because of the volatility of the thinner. Moreover, additional heat is required to bring the added thinner up to the temperature of processing. The present invention is based upon a surprising discovery whereby the varnish base itself may be manufactured by a continuous process without encountering gelling or clogging difficulties and without requiring the use of relatively high pressures.

It is an object of our invention to provide a process for the manufacture of varnish ingredients which substantially eliminates the many disadvantages and limitations in the processes now afforded by the art. A further object is to provide a continuous process for the manufacture of varnish ingredients and thereby reduce the fire hazard to a minimum. Still another object of the invention is to provide a process for the manufacture of varnish ingredients which affords more exact control over rate of heating and any subsequent temperature changes, and substantially eliminates local overheating. A still further object of our invention is to provide a process for the manufacture of varnish ingredients which affords greater production efficiency and yields a product of uniform qualities. Still another object is to provide a process which permits the continuous manufacture of a varnish base comprising gelling oils such as China-wood oil. A further object is to afford a continuous process for the manufacture of varnish bases comprising gelling oils such as China-wood oil which permits production at substantially any rate without gel formation. The above and many other objects will be apparent from the following description of our invention.

The present invention is based upon the surprising discovery that a varnish base and the like comprising a gelling oil such as China-wood oil may be prepared in a continuous manner, without encountering clogging difficulties as a result of the solidification or gelation of the varnish base, if the varnish base ingredients are heat treated in two separate steps, the first being a recycling operation wherein the major portion of the feed stock is recycled in the relatively hot initial section of the heater tube. The feed is then passed to a secondary and much longer length of tubing where the bodying is completed at a substantially lower temperature. In reality this method of operation is a device for taking advantage of the further basic discovery that the normal gelation tendency of the varnish base is completely altered if a relatively small amount of varnish base ingredients is continuously fed into and removed from a thoroughly agitated larger quantity of the same ingredients maintained above a certain critical temperature, which is specific for different resins and varying percentages thereof. After such a preliminary treatment at a suitable temperature and for a suitable length of time, controlled by the rate of feed, the partially formed varnish base may then be further bodied without danger of gelation by passing it through a heated coil even though conditions of viscous flow exist.

The present discovery, therefore, permits the continuous manufacture of a varnish base without the necessity of maintaining turbulent flow throughout the whole apparatus. Moreover, since the ingredients being processed may be charged to and withdrawn from the recycle section at practically any rate desired, the apparatus can operate at any capacity desired. On the contrary, if turbulent flow must be maintained throughout the entire flow of the material, the extensive scope of the apparatus required would present a serious handicap, which probably would render the process impractical. Furthermore, the capacity of such an apparatus would be governed by the rate of flow required to maintain turbulency and could not be varied at will.

Accordingly in carrying out the process of our invention, an apparatus is employed comprising two heating zones. The first consists of a relatively small zone in which the material is heated to the temperature of processing and where preferably a recycle rate of about twenty to one is maintained by a suitable recycling pump. The second zone comprises a relatively large "soaking" zone wherein the heated material from the recycle system remains for a sufficient length of time to develop the desired properties in the varnish base, e. g., body, gas-proofness, compounding, etc. The finished varnish base withdrawn from the soaking zone may then be cooled and thinners added to produce the finished varnish. The thinners may be added to the varnish base in a batch manner, or, if desired, may be run into the varnish base in a continuous manner as it is withdrawn from the soaking zone. In order to further insure against gelation, the heating zones should be brought to the temperatures of processing, usually between about 500° F. and about 680° F. before introducing the material to be processed. Moreover, it is advisable to prepare the feed stock in a heated condition, as for instance at temperatures between about 300° F. and about 400° F., which are below reaction temperatures, and then introduce the heated stock into the heated zones. In this manner the material being processed may be brought more quickly to the temperature of reaction.

It has been found that the resins themselves have varying effects on the rates of reactions involved in the manufacture of varnishes. For instance, if we take the time required for bodying and compounding a mixture of China-wood oil and a phenol-formaldehyde resin, as, for example, Bakelite resin #XR 820, as a standard, then based on this standard, ester gum as well as some other resins considerably retard the rates of reactions required to produce the desired compounding, bodying, etc. and, therefore, when such resins are used, a longer period of heating must be afforded. In the case of some other resins, as, for instance, certain resins derived from petroleum, the rate of reaction are even increased. Accordingly the time of heating should be decreased for such compositions. It is to be clearly understood, however, that the present process can be applied to the manufacture of varnishes in general using any of the various synthetic or natural resins and to the heat treating of the oils themselves. Therefore, if it is so desired, China-wood oil may be bodied alone by the present process.

The extent of heating, which is governed by the temperature, the rate at which the materials are passed through the heating zone and the length of the heating zone, varies in each particular case depending upon the materials being treated, their proportions, properties desired in the finished product, etc. Moreover, the relative temperatures in the recycle system and the soaking zone are critical for the successful operation of the process, and they vary for different compositions of feed, rate of feed and properties desired in the finished product. It is believed clear, therefore, that definite limitations cannot be stated covering all the conditions of operation. However, these conditions may be broadly defined by theoretical considerations, to which, again, we do not wish to be held.

Apparently the bodying of drying oils and varnishes results from two separate and distinct types of reactions. The first we believe to be substantially chemical in nature, representing an intra-molecular reaction between the unsaturated systems present in the drying oils. This chemical polymerization appears to be a relatively slow reaction, whereas when the chemical polymers have reached a certain concentration, a second and much faster reaction sets in, largely physical and concerned with the formation of the micelles of the gel structure. Once the latter type of reaction starts, viscosity increases rapidly and gelation soon results. It is apparently the second type of reaction that is largely responsible for gelation difficulties in the tubes when continuously processing oil, particularly China-wood oil, and resin mixtures.

We have found that the relative extent to which these two types of reactions take place may be controlled to a limited degree by the temperatures maintained in the recycle and soaking zones of our apparatus and by the rate at which the feed is passed through. In practice the proper temperatures for operation depend upon the following considerations.

If China-wood oil or a wide variety of its mixtures with resins are heated rapidly above a specific critical temperature, they will not gel upon continued heating at that temperature; but the resulting product is worthless as a varnish because its drying properties have been practically entirely destroyed. Data to illustrate this point are shown graphically in Figure 3. The data were obtained by observing the time to gelation when the various mixtures contained in test tubes (5½"x⅝") were immersed in a well agitated, constant temperature bath. Each test tube carried a glass stirring rod and the contents were considered to have gelled when the tube could be lifted from the bath by the stirring rod. It will be observed that the gelation rate increases with increasing temperature up to a certain specific value for each mixture (the maximum gelation temperature), beyond which the gelation rate rapidly decreases again until a point (the minimum non-gelling temperature) is reached when no gel forms even on prolonged heating as indicated by the dotted lines. Since this type of data can be easily obtained for any product it offers a convenient means of determining the actual operating conditions for any particular composition as is pointed out hereinbelow.

In general we have found that for contact times in the recycle portion of the system of one-half minute to about two minutes the temperature should be maintained at about 25° F. to 75° F. above the temperature showing a maximum gelation rate, namely, the point where the curves in Figure 3 begin to bend back on themselves. For minimum drying time in the finished product the temperature in the soaking portion should be substantially lower, generally from 30° F. to 80° F. below this point of maximum gelation rate. That is to say, the above typifies the general idea that the contact in the recycle zone should be at a temperature of at least the minimum non-gelling temperature for the particular composition and for a sufficient length of time to inhibit further gelling tendencies of the composition at lower temperatures but for an insufficient length of time to impart undesirable non-drying properties, and the contact in the soaking zone should be at a bodying temperature which is below the minimum non-gelling temperature, and preferably below the maximum gelation temperature, and for a sufficient length of time to impart the desired body, gas-proofness, compounding, etc. to the composition. If rapid drying of the finished product is not a consideration, temperatures in the recycle system may be carried higher within wide limits and the range of practical working temperatures in the soaking zone may be broad depending upon the properties desired in the finished product.

In order to insure rapid heating and thorough mixing of the fresh feed, at least a ninety per cent recycle ratio should be maintained and the tubing in that portion of the system should be of a suitable size so that at least conditions approaching turbulent flow are maintained. In place of the recycle system we find it equally practical to use a chamber of suitable size, equipped with a high speed stirrer for rapidly and thoroughly mixing the fresh feed.

The invention will be further explained with reference to the accompanying drawings wherein Fig. 1 is a side elevation of a suitable arrangement of apparatus, Fig. 2 shows a chamber type of heater that may be used in place of that shown in Fig. 1 and Fig. 3 is a graph showing temperature against gelation time for China-wood oil and some of its typical resin mixtures.

Referring to Fig. 1, a recycle heating zone comprising a primary coil 1 in the form of a U tube is heated by suitable heating means, such as electrical resistance heater 2. One end of U tube 1 is connected by pipe 3 to the discharge of constant feed pump 4 and to the discharge end of gear pump 5 through pipe 6. The other end of U tube 1 is connected by pipe 7 to the suction of gear pump 5 and by pipe 8 to a soaking zone, comprising secondary coil 9. Suitable auxiliary heating means such as electrical resistance heater 10 is provided for coil 9. The outlet of coil 9 is provided with an adjustable back pressure regulator such as valve 11. Insulation 12 is provided around substantially all the setup in order to eliminate excessive heat loss. A third pump and coil may be added, if desired, to the above equipment for continuously thinning and cooling the varnish base withdrawn from coil 9.

In operation, linseed oil, for example, is passed through the apparatus until proper temperatures have been attained. The feed stock, usually preheated, is then passed into the apparatus. The stock first enters the relatively small recycling system comprising the primary heating coil 1 wherein it is heated up to at least its minimum non-gelling temperature. Feed stock which has been properly heated to its minimum non-gelling temperature then passes over into the more extended soaking zone comprising secondary coil 9 wherein the stock flows more slowly and sufficient time is permitted for bodying, gas proofing, compounding, etc. to occur without fear of gelation. Gear pump 5 which recycles the feed stock through heater 1 operates at a relatively high speed in order to flow the recycle stock at a sufficiently high rate to mix the fresh feed rapidly and thoroughly with the stock already heated up to reaction temperature. By suitable regulation of charge pump 4 and back pressure regulator 11 any desired rate of flow through the relatively large remainder of the system (and therefore rate of production) may be provided.

In Figure 2 an alternate type of heating zone is shown comprising a tank 13, encased with insulation 14. Tank 13 may be connected to pump 4 by means of pipe 15 and to soaking coil 9 or other suitable soaking zone through pipe 16. Stirrer 17 actuated by any suitable means (not shown) is provided for rapidly and thoroughly mixing the fresh feed with the stock already heated to reaction temperature. Suitable heating means (not shown) is provided for tank 13.

In case the chamber type heating zone of Fig. 2 is substituted for that shown in Figure 1, the operation would be quite similar except the stirring device 17 would provide the required degree of mixing while the material is being heated to reaction temperature rather than a high speed recycling system. If quantities of a few gallons per hour are to be processed the device shown in Figure 2 has the distinct advantage of being mechanically simpler as well as being easier to clean. However, for relatively larger rates of throughput, the chamber type of heater would be less practical because of the high heat input required per unit of area. If desired, the coil soaking chamber may be replaced by a suitable tank. If this is done it is well to also provide a stirrer in this tank for slight agitation. Strong agitation such as required in the chamber type heating tank, however, is not necessary.

The following example is given to further illustrate the invention: The apparatus comprises a primary coil (recycle heating coil) of $\tfrac{5}{16}''$, outside diameter, copper tubing 6' in length, a secondary coil (soaking coil) of $\tfrac{1}{4}''$, outside diameter, copper tubing 50' in length, a charging pump capable of delivering under 150 lbs. pressure and a gear pump (recycle pump) capable of delivering 1.5 to 2.0 gals./min. under 75 lbs. pressure. The feed stock comprises one part of ester gum with two parts of China-wood oil. This stock is preheated to 300° F. before being passed into the apparatus. The apparatus is brought up to temperature while passing linseed oil therethrough and requiring about 45 min. When the temperature, indicated by a thermocouple brazed on the outlet of the primary coil, is 580° F., the rate of fresh feed is regulated to 0.40 gallon per hour and the feed is changed from linseed oil to the raw varnish stock mixture of 2 parts China-wood oil and 1 part ester gum. The secondary coil temperatures are maintained at 550 to 560° F. inlet and 520 to 530° F. outlet. The coil in this case is sufficiently well lagged so that the electrical heater is unnecessary to maintain the temperature once it is attained. Within 30 minutes after initially introducing the raw varnish stock, equilibrium throughout the apparatus is sufficiently well established and the finished varnish base may be collected continuously.

Accordingly, our process represents a decided advance over the processes enjoyed heretofore in the varnish industry. By heating the varnish in a tube coil, the fire hazard is reduced to a minimum and if for any reasons, such as a leak, the material in the tube should catch fire, valves may be provided along the tube, whereby the flow can be instantly stopped. Since the materials are passed continuously through a small tube with thorough mixing the heating is uniform, eliminating any danger of local overheating. Further, since the temperature and heating are uniform and may be exactly controlled, the reaction may be carried out at higher temperatures than is safe in batch operation, thereby speeding up the process and affording a saving in time. As a result of the exact control over the entire process a uniform product is always produced, while in batch operation this is practically impossible since conditions therein cannot be exactly duplicated from batch to batch with exact control thereover. As is obvious from the fact that the material is in a closed tube, there is very little, if any, contact of the material at high temperature with air, resulting in deleterious oxidation. Moreover, the obnoxious fumes are easily controlled, which, in batch operation, is often a serious annoyance to the surrounding community as well as to the varnish factory.

While the invention has been described with particular reference to China-wood oil, it is to be understood that our process is applicable to the manufacture of varnish bases comprising any other oil which has similar tendencies to form gels. Likewise, the present process may be used with advantage in the manufacture of varnish bases in general, regardless of whether the oil vehicle tends to form a gel.

We claim:

1. A continuous process for heat treating film-forming material comprising quick-drying oil whereby the material possesses tendencies to gel when heated in a continuous manner under bodying conditions of temperature and time and in which the material consists essentially of a film-forming substance selected from the group consisting of drying oil and a mixture of drying oil with a resin which comprises maintaining a relatively large quantity of said material at a non-gelling temperature which is above the maximum temperature at which the untreated material will gel from heat, maintaining all portions of said large quantity of material above said maximum temperature and in a well agitated state, continuously adding a relatively small quantity of said material to be treated to said relatively large quantity in a sufficiently low ratio that the added quantity is heated above said maximum temperature at which gelation occurs in less time than is required to gel the material at any temperature from heat, and continuously withdrawing a relatively small quantity of heated material from said relatively large quantity in such ratio and under such conditions that heated material remains at a temperature above said maximum temperature long enough to remove its tendencies to gel under bodying conditions of temperature and time but not long enough to substantially impair its quick-drying property.

2. A continuous process for heat treating film-forming material possessing tendencies to gel when heated in a continuous manner under bodying conditions of temperature and time and in which the material consists essentially of a film-forming substance selected from the group consisting of drying oil and a mixture of drying oil with a resin which comprises maintaining a relatively large quantity of said material at a non-gelling temperature which is above the maximum temperature at which the untreated material will gel from heat, maintaining all portions of said large quantity of material above said maximum temperature and in a well agitated state, continuously adding a relatively small quantity of said material to be treated to said relatively large quantity in a sufficiently low ratio that the added quantity is heated above said maximum temperature at which gelation occurs in less time than is required to gel the material at any temperature from heat, and continuously withdrawing a relatively small quantity of heated material from said relatively large quantity in such ratio and under such conditions that heated material remains at a temperature above said maximum temperature long enough to remove its tendencies to gel under bodying conditions of temperature and time but not long enough to substantially impair its quick-drying property.

3. A continuous process for the manufacture of a varnish base without encountering gelling difficulties from a suitable mixture consisting essentially of a resin and a quick-drying oil so that it has a tendency to gel when cooked in continuous manner under bodying conditions of temperature and time which comprises cooking the mixture by maintaining a relatively large quantity of said mixture at a non-gelling temperature which is above the maximum temperature at which the untreated mixture will gel from heat, maintaining all portions of said large quantity of mixture above said maximum temperature and in a well agitated state throughout all portions thereof, continuously adding a relatively small quantity of said mixture to be cooked to said relatively large quantity in a sufficiently low ratio that the added quantity is heated substantially immediately above said maximum temperature at which gelation occurs, continuously withdrawing a relatively small quantity of heated mixture from said relatively large quantity in such ratio and under such conditions that heated mixture remains at a temperature above said maximum temperature long enough to remove its tendencies to gel under bodying conditions of temperature and time but not long enough to substantially impair its quick-drying property, and then heating said withdrawn quantity in a soaking zone for a sufficient length of time at a proper bodying temperature to impart the desired body thereto.

4. A continuous process of treating a material consisting essentially of China-wood oil in order to remove its gelling tendencies when heated under bodying conditions of temperature and time, without substantially impairing its quick-drying properties, which comprises maintaining a relatvely large quantity of said oil at a non-gelling temperature which is above the maximum temperature at which the untreated oil will gel from heat, maintaining all portions of said large quantity of oil above said maximum temperature and in a well agitated state, continuously adding a relatively small quantity of said oil to be treated to said relatively large quantity in a sufficiently low ratio that the added quantity is heated substantially immediately above said maximum temperature at which gelation occurs, and continuously withdrawing a relatively small quantity of heated oil from said relatively large quantity in such ratio and under such conditions that heated oil remains at a temperature above said maximum temperature long enough to remove its tendencies to gel under bodying conditions of temperature and time but not long enough to substantially impair its quick-drying property.

5. A continuous process for the manufacture of a varnish base from a suitable mixture consisting essentially of a resin and China-wood oil without encountering gelling difficulties which comprises cooking the mixture by maintaining a relatively large quantity of said mixture at a non-gelling temperature which is above the maximum temperature at which the untreated mixture will gel from heat, maintaining all portions of said large quantity of mixture above said maximum temperature and in a well agitated state, continuously adding a relatively small quantity of said mixture to be cooked to said relatively large quantity in a sufficiently low ratio that the added quantity is heated substantially immediately above said maximum temperature at which gelation occurs, continuously withdrawing a relatively small quantity of heated mixture from said relatively large quantity in such ratio and under such conditions that heated mixture remains at a temperature above said maximum temperature long enough to remove its tendencies to gel under bodying conditions of temperature and time but not long enough to substantially impair its quick-drying property, and then heating said withdrawn quantity by flowing it through a soaking zone for a sufficient length of time at a proper bodying temperature to impart the desired body thereto.

6. A continuous process for bodying a material consisting essentially of China-wood oil without encountering gelling difficulties which comprises cooking the oil by maintaining a relatively large quantity of said oil at a non-gelling temperature which is above the maximum temperature at which the untreated oil will gel from heat, maintaining all portions of said large quantity of oil above said maximum temperature and in a well agitated state by maintaining all of it as a rapidly flowing stream that is recycled through a coil heating zone, continuously adding a relatively small quantity of said oil to be cooked to said relatively large quantity in a sufficiently low ratio that the added quantity is heated substantially immediately above said maximum temperature at which gelation occurs, continuously withdrawing a relatively small quantity of heated oil from said relatively large quantity in such ratio and under such conditions that heated oil remains at a temperature above said maximum temperature long enough to remove its tendencies to gel under bodying conditions of temperature and time but not long enough to substantially impair its quick-drying property, and then heating said withdrawn quantity in a soaking zone for a sufficient length of time at a proper bodying temperature to impart the desired body thereto.

7. A continuous process for the manufacture of a varnish base from a suitable mixture consisting essentially of a resin and China-wood oil without encountering gelling difficulties which comprises cooking the mixture by maintaining a relatively large quantity of said mixture at a non-gelling temperature which is above the maximum temperature at which the untreated mixture will gel from heat, maintaining all portions of said large quantity of mixture above said maximum temperature and in a well agitated state by maintaining all of it as a rapidly flowing stream that is recycled through a coil heating zone, continuously adding a relatively small quantity of said mixture to be cooked to said relatively large quantity in a sufficiently low ratio that the added quantity is heated substantially immediately above said maximum temperature at which gelation occurs, continuously withdrawing a relatively small quantity of heated mixture from said relatively large quantity in such ratio and under such conditions that heated mixture remains at a temperature above said maximum temperature long enough to remove its tendencies to gel under bodying conditions of temperature and time but not long enough to substantially impair its quick-drying property, and then heating said withdrawn quantity in a soaking zone for a sufficient length of time at a proper bodying temperature to impart the desired body thereto.

8. A continuous process for the manufacture of a varnish base from a suitable mixture consisting essentially of a resin and China-wood oil without encountering gelling difficulties which comprises cooking the mixture by maintaining a relatively large quantity of said mixture at a non-gelling temperature which is above the maximum temperature at which the untreated mixture will gel from heat, maintaining all portions of said large quantity of mixture above said maximum temperature and in a well agitated state by maintaining all of it as a rapidly flowing stream that is recycled through a coil heating zone, continuously adding a relatively small quantity of said mixture to be cooked to said relatively large quantity in a sufficiently low ratio that the added quantity is heated substantially immediately above said maximum temperature at which gelation occurs in less time than is required to gel the mixture at any temperature from heat, continuously withdrawing a relatively small quantity of heated mixture from said relatively large quantity in such ratio and under such conditions that heated mixture remains at a temperature above said maximum temperature long enough to remove its tendencies to gel at any temperature from heat when bodied but not long enough to substantially impair its quick-drying property, the recycle ratio for said coil heating zone being at least about 90%, and then heating said withdrawn quantity by flowing it through a soaking zone for a sufficient length of time at a proper bodying temperature to impart the desired body thereto.

9. A continuous process for the manufacture of a varnish base from a suitable mixture consisting essentially of a phenolformaldehyde resin and China-wood oil without encountering gelling difficulties which comprises cooking the mixture by maintaining a relatively large quantity of said mixture at a non-gelling temperature which is above the maximum temperature at which the untreated mixture will gel from heat, maintaining all portions of said large quantity of mixture above said maximum temperature and in a well agitated state by maintaining all of it as a rapidly flowing stream that is recycled through a coil heating zone, continuously adding a relatively small quantity of said mixture to be cooked to said relatively large quantity in a sufficiently low ratio that the added quantity is heated substantially immediately above said maximum temperature at which gelation occurs in less time than is required to gel the mixture at any temperature from heat, continuously withdrawing a relatively small quantity of heated mixture from said relatively large quantity in such ratio and under such conditions that heated mixture remains at a temperature above said maximum temperature long enough to remove its tendencies to gel at any temperature from heat when bodied but not long enough to substantially impair its quick-drying property, the recycle ratio for said coil heating zone being at least about 90%, and then heating said withdrawn quantity by flowing it through a soaking zone for a sufficient length of time at a proper bodying temperature to impart the desired body thereto.

MALCOLM F. PRATT.
THOMAS L. APJOHN.
JOHN HAPPEL.